(12) United States Patent
Blakeslee et al.

(10) Patent No.: US 7,644,567 B2
(45) Date of Patent: Jan. 12, 2010

(54) FLEXIBLE TALL CROP PUSHER

(75) Inventors: Edward A. Blakeslee, Ephrata, PA (US);
Wayne D. Thaxton, Denver, PA (US);
Anthony F. Diederich, Jr., Terre Hill, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/113,371

(22) Filed: May 1, 2008

(65) Prior Publication Data
US 2009/0272090 A1   Nov. 5, 2009

(51) Int. Cl.
*A01D 34/00* (2006.01)
(52) U.S. Cl. ...................................................... 56/17.3
(58) Field of Classification Search ................. 56/17.3, 56/17.4, 320.1, 192; D15/32, 10, 14
See application file for complete search history.

(56) References Cited

U.S. PATENT DOCUMENTS

| | | | | |
|---|---|---|---|---|
| 3,014,326 | A * | 12/1961 | Murray .............................. | 56/1 |
| 3,118,264 | A | 1/1964 | Barnes | |
| 3,306,015 | A * | 2/1967 | Myers .......................... | 56/12.7 |
| 4,258,535 | A * | 3/1981 | Jones et al. ................... | 56/13.6 |
| 4,739,609 | A * | 4/1988 | Meier et al. .................... | 56/192 |
| 5,125,713 | A * | 6/1992 | Willingham et al. .......... | 296/98 |
| 5,279,100 | A * | 1/1994 | Pruitt et al. ...................... | 56/1 |
| 5,331,794 | A * | 7/1994 | Reichle ........................ | 56/17.4 |
| 5,421,145 | A * | 6/1995 | Pruitt et al. ....................... | 56/6 |
| 5,566,535 | A * | 10/1996 | Pruitt .......................... | 56/15.1 |
| 5,657,620 | A * | 8/1997 | Thagard et al. ............... | 56/15.2 |
| 5,727,371 | A * | 3/1998 | Kieffer et al. ...................... | 56/6 |
| 5,765,348 | A * | 6/1998 | Thagard et al. ............... | 56/15.2 |
| 5,768,865 | A | 6/1998 | Rosenbalm et al. | |
| 5,966,913 | A | 10/1999 | Neuerburg | |
| D417,458 | S * | 12/1999 | Waibel ......................... | D15/14 |
| 6,003,292 | A * | 12/1999 | Waibel ....................... | 56/320.2 |
| 6,158,201 | A * | 12/2000 | Pruitt et al. ....................... | 56/6 |
| 6,205,752 | B1 * | 3/2001 | Hess et al. ......................... | 56/6 |
| 7,356,982 | B2 * | 4/2008 | Barnett ......................... | 56/153 |
| D581,956 | S * | 12/2008 | Dairon et al. ................ | D15/32 |
| 2002/0073670 | A1 * | 6/2002 | Nieschulze ...................... | 56/1 |
| 2005/0120698 | A1 * | 6/2005 | Schlasse ...................... | 56/255 |
| 2007/0204587 | A1 | 9/2007 | Rosenbalm et al. | |

* cited by examiner

*Primary Examiner*—Árpád Fábián-Kovács
(74) *Attorney, Agent, or Firm*—Patrick M. Sheldrake; John William Stader; Michael G. Harms

(57) ABSTRACT

A flexible tall crop knockdown barrier for use with rotary cutting headers in harvesting specialty crops such as grass seed. The knockdown barrier comprises a support frame mounted to the front of the header that extends forwardly and upwardly ahead of the header. A flexible barrier supported by the frame extends downwardly during idle conditions and downwardly and rearwardly as the header is propelled through the crop. The flexible curtain may be rolled around a lower spool and stowed on the support frame when not in use to improve visibility. The knockdown barrier serves to gently lean the crop forward before cutting so as to minimize seed shatter due whipping of the seed head.

18 Claims, 4 Drawing Sheets

FLEXIBLE TALL CROP PUSHER

BACKGROUND OF THE INVENTION

This invention relates generally to a machine for harvesting crops in a field and, more particularly, to a flexible crop curtain for directing crop movement into a rotary cutting header for harvesting tall, seed-bearing specialty crops.

In modern crop harvesting machines, it is desirable to optimize cutting headers for specific crops in order to maximize harvesting efficiency. Such optimized headers are typically based on existing header designs with specific-purpose modifications incorporated to alter finite portions of the crop flow into or within the header to suit the specific crop being harvested. This approach helps control production costs of the equipment and extends the life cycle of a basic header design.

One specific application involves harvesting of grass seed or other specialty crops having seeds on a stem which must be cut and dried in a windrow before threshing. Care must be taken when working with such crops to minimize disturbances to the crop material during the cutting and windrowing operation which can dislodge the seeds from the stem, especially when a rotary disc cutterbar is used.

Use of rotary cutterbar headers is well-known in the crop harvesting field and is favored due to higher ground speed capability compared to conventional sicklebar cutters. U.S. Pat. No. 5,784,866 granted to Campbell et al. on Jul. 28, 1998 shows a typical rotary crop severing header of this type. Rotary cutterbar headers are generally characterized by a forward opening that is short (on the order of 18 inches) and usually features a protective curtain to prevent debris struck by the rotary cutters from being ejected from the header. While such a short forward opening is not problematic in normal harvesting operations in which crop height may not significantly exceed the top of the forward opening, some grasses may be up to six feet tall at harvest. Lacking a reel or other apparatus to properly position the crop entering the header, a rotary disc cutterbar header moving through the tall grass initially causes the stem to be bent rearwardly followed by a forward whipping motion of the seed head as the top of the header moves over the base of the stem. This whip lash effect leads to loss of seed and is undesirable in a specialty crop header.

It would be desirable to provide an apparatus for managing the position of tall, seed-bearing crop as the crop enters a specialty crop header which reduces the loss of seed from the crop while efficiently positioning the crop for severing by a rotary disc cutterbar that overcomes the above problems and limitations. Still more desirable would be an apparatus that for managing entry of tall crops into a rotary disc cutterbar header that may be repositioned when not in use to avoid obstructing forward visibility from the machine.

SUMMARY OF THE INVENTION

Accordingly, it is an object of the present invention to provide a rotary disc cutterbar header optimized for use with specialty seed-bearing crop applications such as the harvest of grass seed.

It is a further object of the present invention to provide a curtain for a specialty crop harvesting header that more gently positions the crop for cutting and windrowing.

It is a further object of the present invention to provide a curtain for gently leaning tall crop forward prior to cutting to reduce seed loss.

It is a further object of the present invention to provide a flexible curtain disposed forwardly and upwardly from the inlet opening of a rotary disc cutterbar header that can be re-positioned when not in use to maintain operability visibility.

It is a still further object of the present invention to provide a curtain for directing tall crop material into a header that is easily connected or removed from the header.

It is a still further object of the present invention to provide a curtain for directing tall crop movement into a header that is easily adaptable for use on a standard header design thereby enabling efficient manufacturing of a variety of crop harvesting headers.

It is a still further object of the present invention to provide a forwardly positioned flexible curtain for optimizing crop movement into a header that is durable in construction, inexpensive of manufacture, carefree of maintenance, easily assembled, and simple and effective to use.

These and other objects are achieved according to the instant invention by providing a flexible tall crop knockdown shield for use with rotary cutting headers in harvesting specialty crops such as grass seed. The knockdown shield comprises a support frame mounted to the front of the header that extends forwardly and upwardly ahead of the header. A flexible curtain supported by the frame extends downwardly during idle conditions and downwardly and rearwardly as the header is propelled through the crop. The flexible curtain may be rolled around a lower spool and stowed on the support frame when not in use to improve visibility. The knockdown shield serves to gently lean the crop forward before cutting so as to minimize seed shatter due whipping of the seed head.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
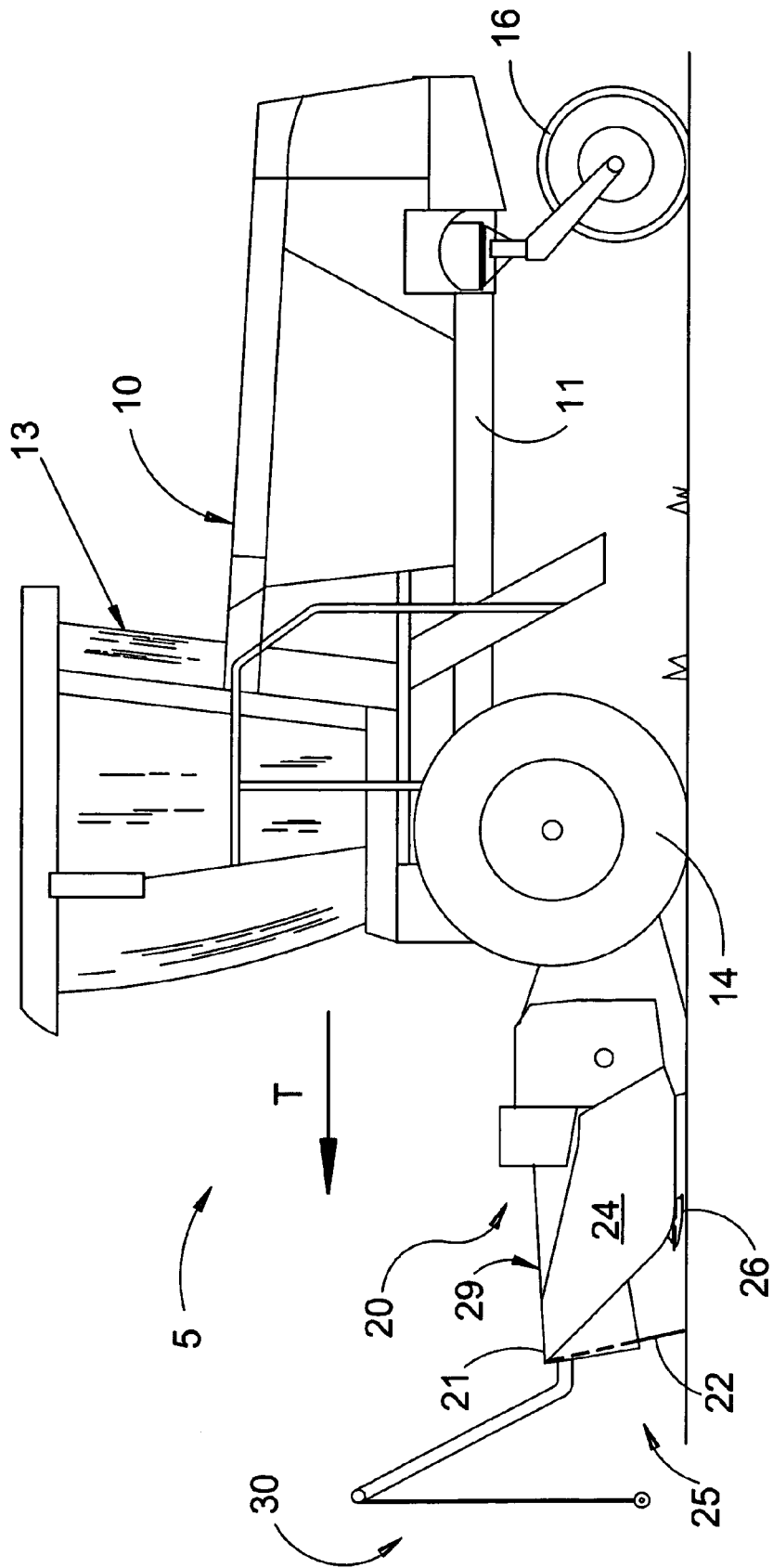
FIG. 1 is a side elevation view of a typical agricultural windrower suitable for fitment with a specialty crop header of the type on which the present invention is useful.

FIG. 1 shows a side view of a typical self-propelled windrower 5 used for harvesting a standing crop as it travels forwardly across the ground in the direction indicated by arrow "T." Usually, a tractor 10 pushes a header 20 which severs the crop material from the ground using a rotary disc cutterbar or other functionally equivalent cutting means arranged along the forward edge of the header 20. The tractor 10 has a chassis 11 for supporting various components of the windrower 5, including a set of transversely spaced-apart drive wheels 14 for propelling the windrower across the ground and at least one, and typically a pair of rear wheels 16 in the form of castors which allow the windrower to turn. There is an operator cab 13 where the operator controls the windrower operation.

Crop material enters the header through an intake area 25 which is bounded along the top by a forward edge 21 positioned at the leading end of upper barrier 29, a pair of laterally opposing side walls 24 at the sides, and by a cutterbar 26 at the bottom. It should be noted that cutterbar 26 is generally positioned rearwardly from the forward edge 21 so that crop is leaned over by the forward edge 21 exposing the base of the crop for optimal cutting by the cutterbar 26. In a rotary cutter cutterbar, crop is severed from the ground by rotary motion of the blades interacting with the crop along the forward half of the rotational plane of the cutters. Forward skirt 22 may be suspended from forward edge 21 to arrange the crop for cutting and prevents debris caught up in the cutterbar 26, from being forwardly ejected from the header. Once cut, the crop material is urged toward the center of the header by motion of the cutterbar 26, by contours of the header, by a transversely arranged crop conveyance means, or any combination thereof. The crop is then ejected rearwardly from the header 20, generally in the space between the drive wheels 14, through a centrally positioned crop discharge zone whereupon it may be directed to a conditioning apparatus and/or ejected to fall to the ground in a windrow. Shields (not shown) are used to arrange the windrow into a desired uniform configuration generally trailing along the longitudinal axis of the windrower.

The general operation and construction of windrowers of the type on which the present invention may find utility can be found in U.S. Pat. Nos. 5,327,709, issued on Jul. 12, 1994, to Webb, 6,073,431, issued on Jun. 13, 2000, to Osborne et al., and 6,662,539, issued on Dec. 16, 2003 to Adams et al., the descriptive portions of which are incorporated herein by reference.

Cutting operations conducted on tall crop (e.g., crop that stands substantially taller than the height of the header) may result in the crop initially folding rearwardly over the forward edge 21 of the header upper barrier 29 as the header passes over the crop. As the header continues its forward movement, the top portion of the crop is then whipped in a forward direction as the header 20 moves further over the base of the crop. A conventional pipe or bar-type of crop pushbar may perform suitably with normal tall crops in which seed harvest is not the primary objective; however, crops such as tall grasses may experience significant seed loss when subjected to such whip lash motion or when interacting with the open structure of a conventional pipe or bar-type of crop pushbar. Even if seed loss is not a concern, drag on the header is increased by the crop movement which increases operating costs. To prevent such undesirable crop motion, a crop pusher 30 is provided on the front of the header to gently lean the crop over in a forward direction as the header 20 approaches in preparation for cutting. Crop pusher 30 extends angularly upwardly and forwardly from the forward edge 21 to present a generally planar surface extending from an area adjacent to the forward edge 21 to the top of the crop pusher 30. Crop pusher 30 spans generally the transverse width of the header 20. Crop pusher comprises a frame 32 supporting a generally horizontal and transversely arranged horizontal top support member 35. A generally imperforate flexible barrier 34 is connected to and supported by the top support member 35 by clips, screws or any other functionally similar fastening means. Flexible barrier 34 interacts with the crop entering the header to gently arrange it for cutting by the cutterbar 26 without undue loss of seed. To this end, the vertical location of top support member 35 is sufficiently spaced above the ground so that the top of the crop being harvested impinges the flexible barrier at a point at or below the top support member 35. As some crop might stand as tall as six feet above the ground requiring the crop pusher to extend a substantial distance above the ground which reduces operator visibility, the flexible barrier 34 can be rolled up and stowed along the horizontal member 35 to improve operator visibility when shorter crop is being cut. Stowing the flexible barrier 34 may be accomplished by straps or clips to secure the rolled barrier in position adjacent to the top support member 35.

Figure 2:
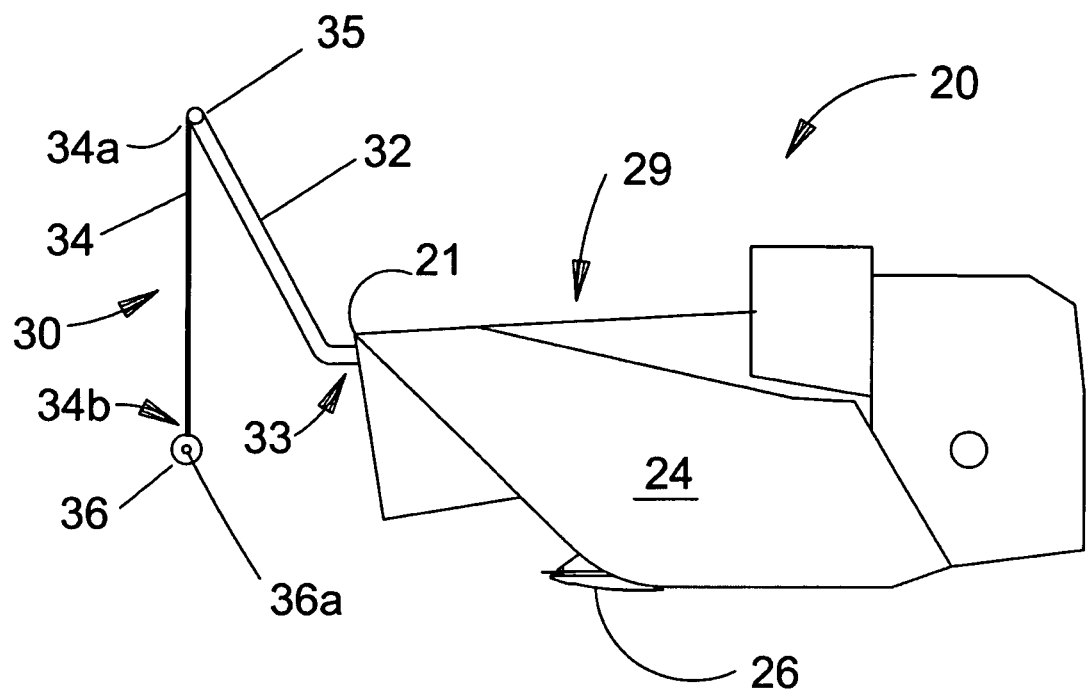
FIG. 2 is a partial side view of a specialty crop header incorporating a first embodiment of the present invention shown in an idle position.

Now referring to FIG. 2, wherein a partial side elevation view of header 20 is shown with crop pusher 30 shown in an idle position such as would occur when the windrower is stationary and no tall crop material is impinging on the crop pusher. Without the force of impinging crop, flexible barrier 34 hangs generally vertically downward from frame 32, supported along its top edge 34a by top support member 35. Lower roll frame 36 is positioned along the bottom edge 34b of the barrier 34. Lower roll bar 36 is preferably an elongate pipe or bar-like structure which spans the transverse width of the pusher 30 and adds weight to the lower edge 34b of barrier to prevent it from flapping. Lower roll bar 36 also provides a structure for stowing the flexible barrier when not required for the particular crop being harvested, discussed below in relation to FIG. 4. Lower roll frame 36 also includes a pair of retainers 36a, one at either end of the roll 36. In one embodiment, retainers 36a are disc-like structures. As the one method of connecting roll bar 36 to barrier 34 is to provide a sleeve-like opening along the lower edge of barrier 34 for receiving roll bar 36, retainers 36a prevent the roll bar 36 from unintentionally sliding out of the sleeve.

Figure 5:
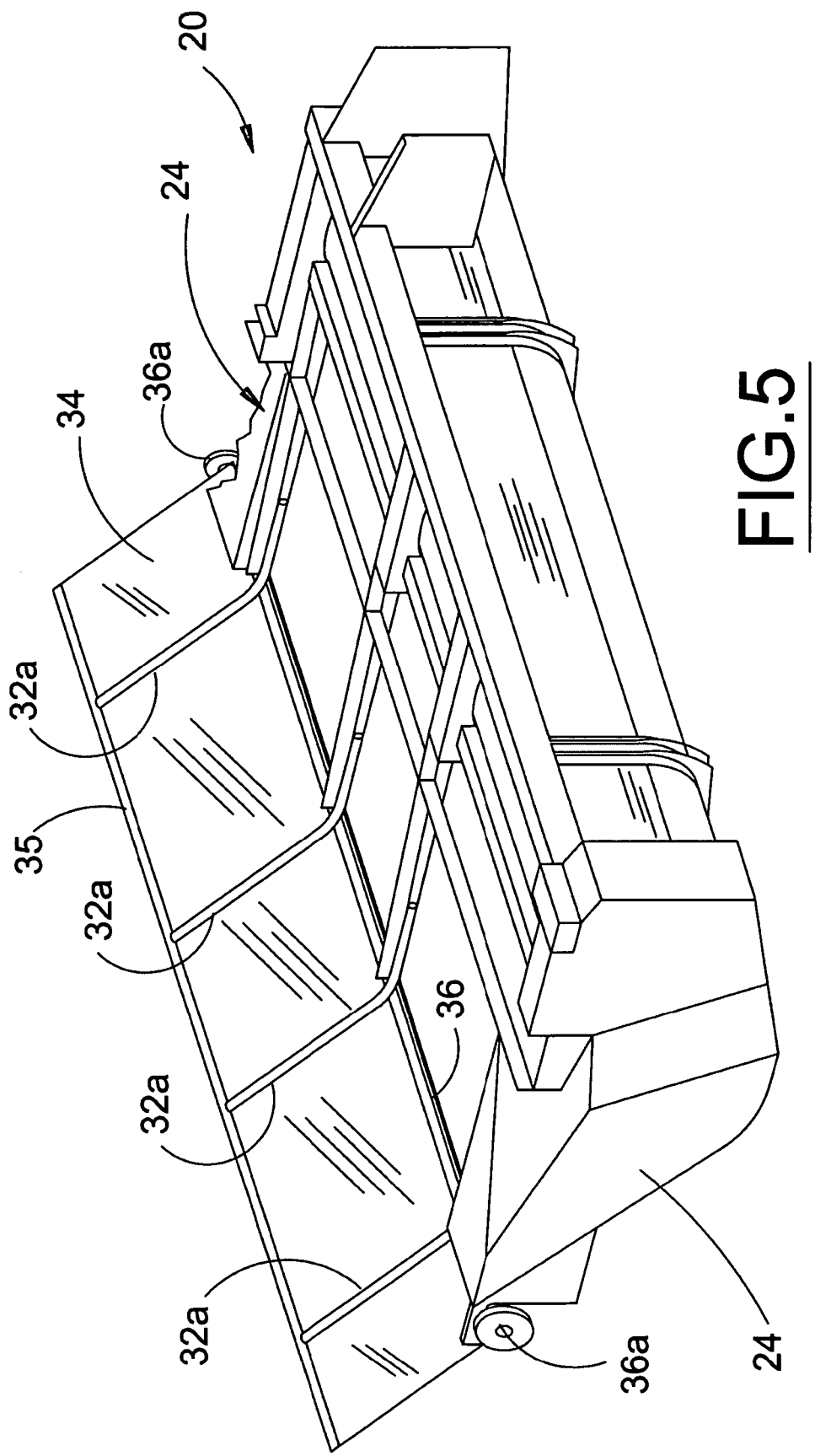
FIG. 5 is a partial perspective view of a specialty crop header showing the present invention in a working position.

Flexible barrier 34 is constructed of a flexible material to enable deflection in response to interaction with crop and to allow it to be rolled up into a stowed position. An imperforate material is specified so that the surface with which the crop material interacts is generally smooth and free of openings, protrusions, or other surface features which could interact with the seed heads in a manner which dislodges the seeds as the seed heads slide along the surface of the barrier. Additionally, material flexibility absorbs some of the impact energy from the initial contact interaction between the seed head and the barrier further reducing seed loss. The material is sufficiently stiff so that it retains a generally planar surface when it is urged into the operating position shown in FIGS. 2 and 5. Flexible barrier 34 is preferably formed from a single, continuous panel of flexible material. Multiple panels may be used for production efficiency if arranged to move in unison as a single flexible barrier. The configuration of frame 32 also contributes to the stiffness; variation in the number of individual frame elements 32a also influences the required stiffness of barrier 34 material. By providing more frame elements 32a, a lighter weight barrier material can be used. The barrier material also must be sufficiently durable to withstand the abrasion caused by crop impinging on the forward surface. In one embodiment, the flexible barrier is formed out of rubber sheet material.

Figure 3:
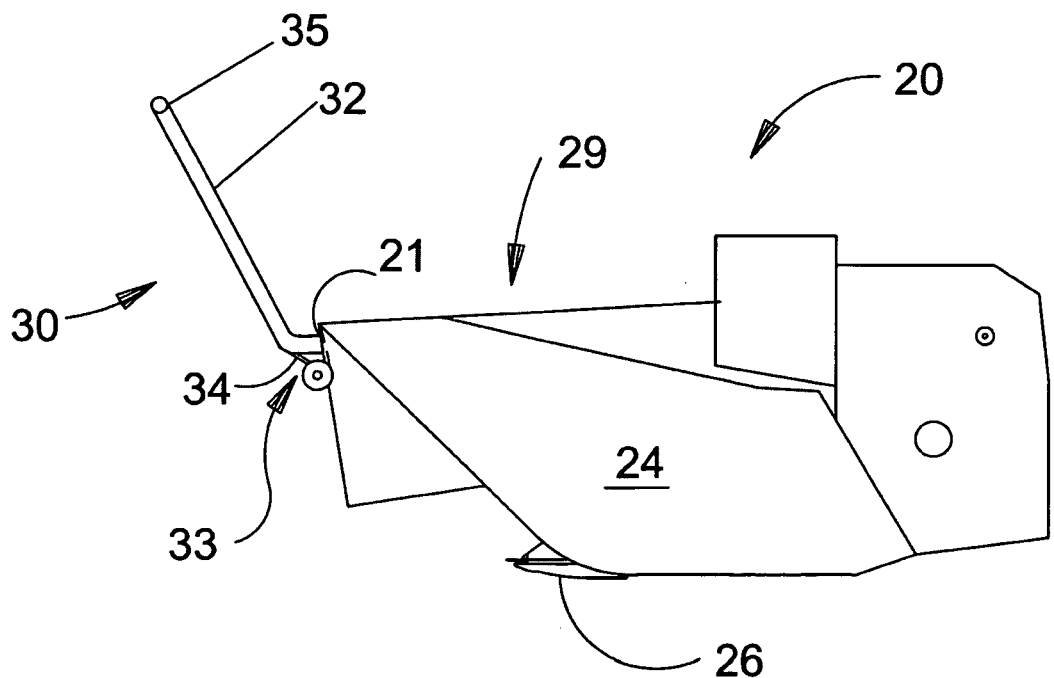
FIG. 3 is a partial side view of a specialty crop header showing the present invention shown in an operating position.

In FIG. 3, crop pusher 30 is shown in an extreme working position as would occur when a tall crop impinges on the flexible barrier 34. As header 20 is propelled forward through a tall crop, flexible barrier 34 is forced rearwardly by the crop until the barrier rests generally against frame 32 in a working position. It should be noted that shorter crop might not urge the barrier 34 to the limit of movement. Accordingly, any barrier 34 position in which the barrier 34 is deflected rearwardly from a vertical position is termed a working position. The angle of the frame 32 relative to the ground is optimized to gently lay the crop over with minimal disruption of the seed-bearing head. Optimally, the angle of the barrier when in a fully displaced working position should result in the base of the crop being engaged by the cutterbar as the crop is generally in full contact with the barrier 34 and aligned generally parallel to the angle of the barrier.

Additionally, the arrangement of frame 32 at its connection to header 20 creates a recess 33 to receive lower roll bar 36 as it is urged rearwardly by interaction with the crop which stabilizes the position of barrier 34 during operation and provides a consistent position for the barrier 34. The angle of the flexible barrier 34 is generally the same as the angle of frame 32, being optimized to streamline crop movement into the header and cutterbar. Retainers 36a are arranged so that each is positioned outwardly adjacent to the structural portions of sidewalls 24 surrounding recess 33 when the barrier 34 is the rearwardmost working position. The size of retainers 36a allows them to engage header sidewalls 24 and prevent significant lateral movement of the lower edge 34b of flexible barrier 34 as the header is propelled through the crop.

Figure 4:
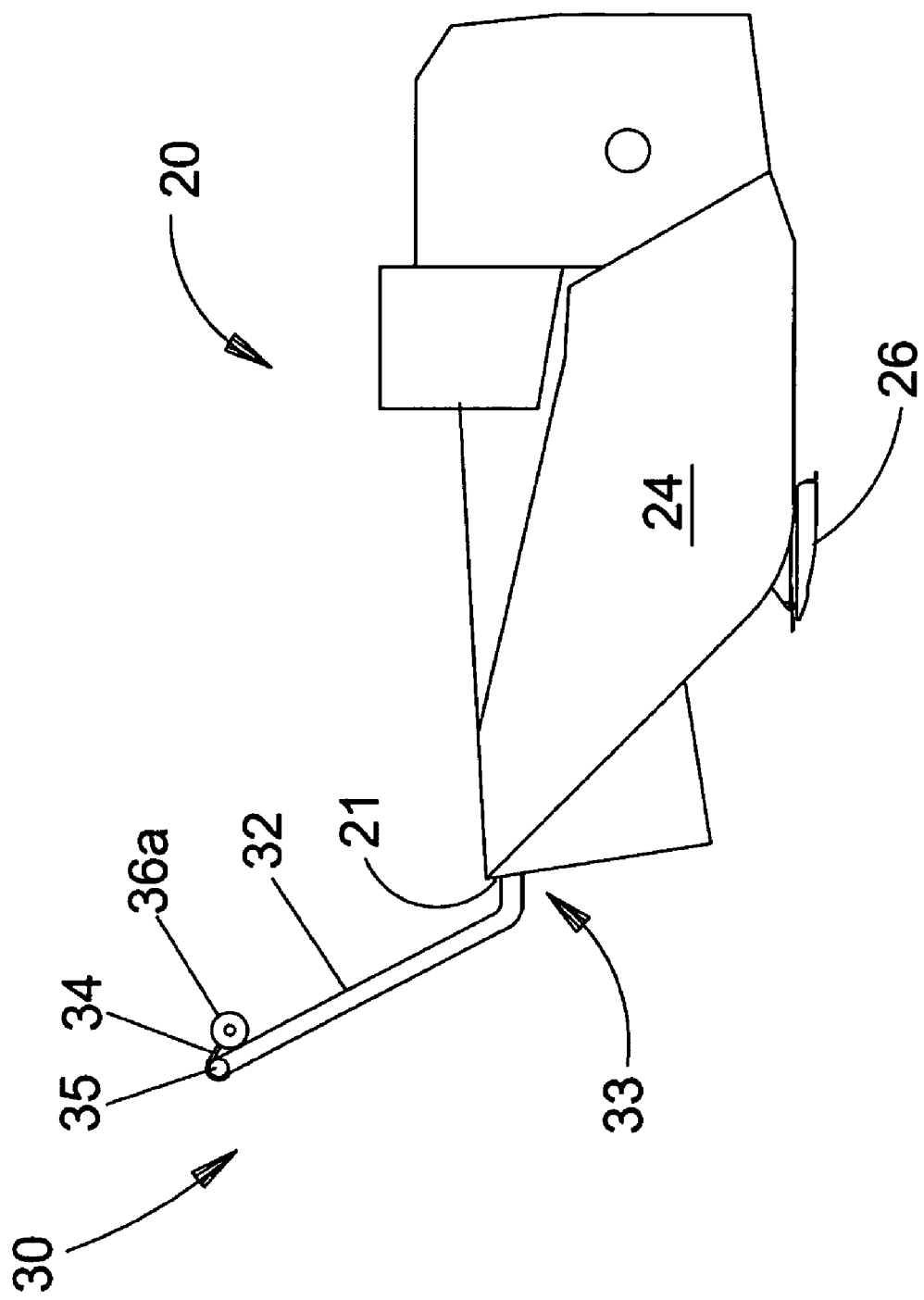
FIG. 4 is a partial side view of a specialty crop header showing the present invention in a stowed (non-functional) position.

Finally, FIG. 4 presents crop pusher 30 configured for operation when a tall crop pusher is not needed. In this configuration, flexible barrier 34 is rolled around lower roll bar 36 and stowed adjacent the top support member 35. As the flexible barrier 34 may be constructed of an opaque material, the ability to position the barrier 34 in a stowage position provides better visibility for the operator when working with shorter crops or when the machine is being moved between fields. Securing the flexible barrier 34 in a stowed position may be accomplished by straps or clips to secure the rolled barrier in position adjacent to the top support member 35. In an alternate embodiment, barrier 34 may be made from a transparent material allowing the operator to see through the barrier when it is deployed in a working or non-working position.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A crop pusher for directing crop movement entering a header on an agricultural crop harvester, the header having a forward facing crop intake for receiving a standing crop, the intake being bounded by generally opposing side walls separated by a transverse width, an upper panel spanning the transverse width to define the top boundary of the intake, and a cutterbar generally spanning the transverse width and defining the bottom boundary of the intake, the cutterbar for severing a standing crop from the ground and depositing cut crop material on the ground in a windrow, the pusher comprising:

a support frame connected to the header and extending angularly upwardly and forwardly from a forward edge of the upper panel toward a distal end, said support frame having a generally horizontal top support member positioned at said distal end and spanning generally the transverse width; and a flexible barrier having a top edge and a generally opposing bottom edge having a roll bar, said top edge connected to and supported by said top support fully ahead of and above the header and substantially spanning the transverse width, said bottom edge being freely movable between a first position, where the bottom edge and top edge are located in a substantially vertical plane, and working positions wherein said bottom edge is rearward of the top edge with respect to the direction of travel such that the barrier angles downwardly and rearwardly from said horizontal support while remaining forward of the sidewalls, wherein the roll bar establishes a rearward most working position by contacting at least one of the support frame or a forward edge of the header wherein in the rearwardmost working position the flexible barrier is generally planar having a similar angle to the support frame.

2. The crop pusher of claim 1, further comprising a pair of retainers, one connected to each end of said roll bar.

3. The crop pusher of claim 2 wherein each of said retainers is a disc connected to an end of said roll bar.

4. The crop pusher of claim 3, wherein said disc engages one of the side walls of the header when said barrier is in said rearwardmost working position to limit axial movement of said roll bar.

5. The crop pusher of claim 1, wherein said flexible barrier further comprises a stowed position in which said flexible barrier is rolled around said roll bar and secured to said top support thereby improving forward visibility for an operator.

6. The crop pusher of claim 1, wherein said top support member is located at a height above the ground that is at least as high as the crop being harvested.

7. A crop pusher for directing crop movement entering a header on an agricultural crop harvester, the header having a forward facing crop intake for receiving a standing crop, the intake being bounded by generally opposing side walls separated by a transverse width, an upper panel spanning the transverse width to define the top boundary of the intake, and a cutterbar generally spanning the transverse width and defining the bottom boundary of the intake, the cutterbar for severing a standing crop from the ground and depositing cut crop material on the ground in a windrow, the pusher comprising:

a support frame connected to the header and extending angularly upwardly and forwardly from the upper panel toward a distal end, said support frame having a generally horizontal top support member positioned at said distal end and spanning generally the transverse width; and a flexible barrier having a top edge and a generally opposing bottom edge parallel thereto, said top edge connected to and supported by said top support and substantially spanning the transverse width, said bottom edge being freely movable between non-working and working positions wherein said barrier angles downwardly and rearwardly from said horizontal support when in a working position;
an elongate roll bar connected to said bottom edge; and
a recess positioned adjacent to the junction of said frame with the header, said recess for receiving said elongate roll bar when said flexible barrier is in a rearwardmost working position.

8. The crop pusher of claim 7, wherein said flexible barrier is made from an imperforate flexible material.

9. The crop pusher of claim 8, wherein said imperforate flexible material is rubber.

10. In a crop harvesting machine having a ground supported chassis for forward movement of a cutting header across the ground, the header having a forward facing crop intake for receiving a standing crop for severing from the ground by a cutterbar, the intake being bounded by generally opposing side walls separated by a transverse width, an upper panel having a forward edge spanning the transverse width to define a top boundary of the intake, and a cutterbar spanning the transverse width below and rearward from the forward edge to define the lower boundary of the crop intake, the cutterbar for severing a standing crop from the ground and depositing cut crop material on the ground in a windrow, the improvement comprising:
a support frame connected to the header and extending angularly upwardly and forwardly from the forward edge toward a distal end, said support frame having a generally horizontal top support member positioned at said distal end and spanning generally the transverse width; and
a flexible barrier having a top edge and a generally opposing bottom edge parallel thereto, said top edge connected to and supported by said top support and substantially spanning the transverse width, said bottom edge being freely movable between non-working and working positions wherein said barrier angles downwardly and rearwardly from said horizontal support when in a working position;
a flexible barrier having a top edge and a generally opposing bottom edge having a roll bar, said top edge connected to and supported by said top support fully ahead of and above the header and substantially spanning the transverse width, said bottom edge being freely movable between a first position, where the bottom edge and top edge are located in a substantially vertical plane, and working positions wherein said bottom edge is rearward of the top edge with respect to the direction of travel such that the barrier angles downwardly and rearwardly from said horizontal support while remaining forward of the sidewalls, wherein the roll bar establishes a rearwardmost working position by contacting at least one of the support frame or a forward edge of the header wherein in the rearwardmost working position the flexible barrier is generally planar having a similar angle to the support frame.

11. The improvement of claim 10, further comprising a pair of retainers, one connected to each end of said roll bar.

12. The improvement of claim 11, further comprising a recess positioned adjacent to the junction of said frame with the forward edge, said recess for receiving said elongate roll bar when said flexible barrier is in a rearwardmost working position.

13. The improvement of claim 12, wherein said flexible barrier is made from an imperforate flexible material.

14. The improvement of claim 13, wherein said imperforate flexible material is rubber.

15. The improvement of claim 11, wherein each of said retainers is a disc connected to an end of said roll bar.

16. The improvement of claim 15, wherein said disc engages one of the side walls of the header when said barrier is in said rearwardmost working position to limit axial movement of said roll bar.

17. The improvement of claim 11, wherein said flexible barrier further comprises a stowed position in which said flexible barrier is rolled around said roll bar and secured to said top support thereby improving forward visibility for an operator.

18. The improvement of claim 11, wherein said top support member is located at a height above the ground that is at least as high as the crop being harvested.

* * * * *